(12) United States Patent
Xu

(10) Patent No.: US 12,388,950 B2
(45) Date of Patent: Aug. 12, 2025

(54) IMAGE DATA PROCESSING METHOD AND ELECTRONIC DEVICE

(71) Applicant: HONOR DEVICE CO., LTD., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/259,608

(22) PCT Filed: Dec. 13, 2022

(86) PCT No.: PCT/CN2022/138818
§ 371 (c)(1),
(2) Date: Jun. 28, 2023

(87) PCT Pub. No.: WO2023/160138
PCT Pub. Date: Aug. 31, 2023

(65) Prior Publication Data
US 2025/0080689 A1      Mar. 6, 2025

(30) Foreign Application Priority Data
Feb. 25, 2022   (CN) .......................... 202210180659.4

(51) Int. Cl.
*H04N 5/77*     (2006.01)
*H04N 23/60*   (2023.01)

(52) U.S. Cl.
CPC ............... *H04N 5/77* (2013.01); *H04N 23/64* (2023.01)

(58) Field of Classification Search
CPC .................................. H04N 5/77; H04N 23/64
See application file for complete search history.

(56) References Cited

U.S. PATENT DOCUMENTS

| | | |
|---|---|---|
| 7,193,646 B1 | 3/2007 | Shioji |
| 10,686,990 B2 | 6/2020 | Jang et al. |
| 2010/0295996 A1 | 11/2010 | Chen et al. |
| 2012/0177346 A1* | 7/2012 | Kuriyama ............... H04N 5/772 386/E5.028 |
| 2015/0125046 A1 | 5/2015 | Ikenoue et al. |

(Continued)

FOREIGN PATENT DOCUMENTS

| | | |
|---|---|---|
| CN | 105430247 A | 3/2016 |
| CN | 107172296 A | 9/2017 |

(Continued)

*Primary Examiner* — Thai Q Tran
*Assistant Examiner* — Jose M Mesa
(74) *Attorney, Agent, or Firm* — Fish & Richardson P.C.

(57) ABSTRACT

This application provides an image data processing method and an electronic device. In the video recording process, image data acquired based on triggering of a user and image data acquired through automatic triggering can be stored orderly, which helps ensure the integrity of the image data. The method includes: acquiring image data, where the image data is image data obtained by a camera through photographing in a video recording process; storing the image data in a first queue if the image data is data acquired by the camera based on triggering of a user; and storing the image data in a second queue if the image data is data acquired by the camera through automatic triggering, where the first queue and the second queue are different queues.

15 Claims, 7 Drawing Sheets

(56) References Cited

U.S. PATENT DOCUMENTS

2015/0271469 A1     9/2015   Hsieh et al.
2019/0377959 A1*   12/2019   Marano .................. G06Q 50/40

FOREIGN PATENT DOCUMENTS

| CN | 107835359 A | 3/2018 |
|----|-------------|--------|
| CN | 108282616 A | 7/2018 |
| CN | 108900790 A | 11/2018 |
| CN | 109348135 A | 2/2019 |
| CN | 110213502 A | 9/2019 |
| CN | 111405238 A | 7/2020 |
| CN | 112422832 A | 2/2021 |
| CN | 112788266 A | 5/2021 |
| EP | 0946044 A2  | 9/1999 |
| EP | 3364645 A2  | 8/2018 |
| WO | 2020103526 A1 | 5/2020 |

* cited by examiner

IMAGE DATA PROCESSING METHOD AND ELECTRONIC DEVICE

CROSS-REFERENCE TO RELATED APPLICATIONS

This application is a national stage of International Application No. PCT/CN2022/138818, filed on Dec. 13, 2022, which claims priority to Chinese Patent Application No. 202210180659.4, filed on Feb. 25, 2022, both of which are incorporated herein by reference in their entireties.

TECHNICAL FIELD

This application relates to the field of image processing, and in particular, to an image data processing method and an electronic device.

BACKGROUND

Generally, the camera application of the mobile phone may include functions such as video recording and photographing. The video recording function of the mobile phone can help the user record a period of wonderful and unforgettable time, and the photographing function of the mobile phone can help the user record wonderful moments. In the video recording process, the mobile phone can support the user to take photos by triggering a photographing button during video recording, and can support the user to view the captured photos in the camera application.

In order to improve the competitiveness of the mobile phone, the mobile phone can not only support the user to take photos by triggering the photographing button during video recording, but also support the user to automatically take images during video recording, so as to better meet different needs of the user. However, in this case, a moment at which the user triggers the photographing button may be close to an automatic photographing moment. In a case that the moment at which the user triggers the photographing button is close to the automatic photographing moment, in a process in which the image data obtained in these two cases is transmitted to data storage queues, the image data may be transmitted simultaneously, which causes data stored in the data storage queues to be confused, and the integrity of the image data to be broken, consequently making it impossible to generate a photo.

Therefore, there is an urgent need for an image data processing method to ensure the integrity of the image data.

SUMMARY

This application provides an image data processing method and an electronic device. In the video recording process, data acquired based on triggering of a user and data acquired through automatic triggering can be stored orderly, which helps ensure the integrity of the image data.

According to a first aspect, this application provides an image data processing method, the method including: acquiring image data, where the image data is image data obtained by a camera through photographing in a video recording process; storing the image data in a first queue if the image data is data acquired by the camera based on triggering of a user; and storing the image data in a second queue if the image data is data acquired by the camera through automatic triggering, where the first queue and the second queue are different queues.

The electronic device may include a camera, or may not include a camera, which is not limited in this application.

When the electronic device includes a camera, the electronic device can perform video recording through the camera, the camera can take photos in the video recording process, and the electronic device can acquire image data through the camera.

In this case, the manner of acquiring the image data by the electronic device is relatively simple and easy to implement.

When the electronic device does not include a camera, the data obtained by the camera through photographing in the video recording process needs to be transmitted to the electronic device, and the electronic device receives the image data from the camera.

In this case, the electronic device is simple in structure and is low in cost.

There may be two manners for triggering the camera to take photos in the video recording process: one triggering manner is user triggering, and the other triggering manner is automatic triggering.

The first queue is used for storing data acquired by the camera based on triggering of the user. When determining that the image data is data acquired by the camera based on triggering of the user, the electronic device may store the image data in the first queue.

The second queue is used for storing data acquired by the camera through automatic triggering. When determining that the image data is data acquired by the camera through automatic triggering, the electronic device may store the image data in the second queue.

The first queue and the second queue are two different queues, that is, different queues are used to respectively store the data acquired by the camera based on triggering of the user and the data acquired by the camera through automatic triggering.

According to the image data processing method provided in this application, the data acquired by the camera based on triggering of the user and the data acquired by the camera through automatic triggering are respectively stored by using different queues in the video recording process, which can avoid out-of-order storage when the image data is stored, and can achieve the effect of orderly saving the data acquired based on triggering of the user and the data acquired through automatic triggering, thereby helping ensure the integrity of the image data.

With reference to the first aspect, in some implementations of the first aspect, the method further includes: determining whether the image data is associated with identification data, where the identification data is used for indicating that the image data is the data acquired by the camera through automatic triggering: and determining, if the image data is associated with the identification data, that the image data is the data acquired by the camera through automatic triggering.

According to the image data processing method provided in this application, in the video recording process, based on that the electronic device supports a user triggering photographing function, a function that the camera automatically triggers photographing is added, and the original data storage manner may not be changed. In the original manner, identification data is merely associated with the data acquired through automatic triggering, and the data is stored in the second queue different from the first queue based on the identification data, which can avoid out-of-order storage when the image data is stored, and can achieve the effect of orderly saving the data acquired based on triggering of the user and the data acquired through automatic triggering, thereby helping ensure the integrity of the image data.

With reference to the first aspect, in some implementations of the first aspect, the acquiring image data includes: detecting, in the video recording process of the camera, whether an image acquired by the camera meets an automatic triggering photographing condition; and generating, in a case that the image acquired by the camera meets the automatic triggering photographing condition, the image data according to the image acquired by the camera, and generating the identification data associated with the image data.

With reference to the first aspect, in some implementations of the first aspect, the method further includes: reading first image data in the first queue or the second queue to generate a first image.

A storage mechanism of each of the first queue and the second queue is first-in-first-out, that is, image data stored first is read first.

Image data is stored in both the first queue and the second queue, and the electronic device may determine a queue for reading image data according to the sequence of acquisition times of the image data.

The first image data is the image data with the earliest acquisition time in the two queues, and the electronic device may read the first image data to generate the first image.

According to the image data processing method provided in this application, the queue for reading image data is determined according to the sequence of acquisition times of the image data in the first queue and the second queue, which helps ensure the orderliness of data reading.

With reference to the first aspect, in some implementations of the first aspect, each piece of image data in the first queue and the second queue includes start time information, image information, and end time information: and the method further includes: after reading the start time information, the image information, and the end time information in the first image data from a queue in which the first image data is located, reading second image data in the first queue or the second queue to generate a second image.

After reading the end time information of the first image data, the electronic device determines the second image data again according to the acquisition times of the image data in the first queue and the second queue, and generates the second image according to the second image data.

According to the image data processing method provided in this application, during reading of image data, only after all the information of one piece of image data is read, the next piece of image data is read, which can improve the accuracy of subsequent generated images, and helps ensure the orderliness of data processing.

With reference to the first aspect, in some implementations of the first aspect, the reading second image data in the first queue or the second queue to generate a second image includes: acquiring an acquisition time of a first piece of image data in the first queue, to obtain first time information: acquiring an acquisition time of a first piece of image data in the second queue, to obtain second time information: comparing a chronological order of the first time information and the second time information; reading, if the first time information is earlier than the second time information, the first piece of image data in the first queue as the second image data, to generate the second image: and reading, if the second time information is earlier than the first time information, the first piece of image data in the second queue as the second image data, to generate the second image.

According to a second aspect, this application provides an electronic device, including an acquisition module and a processing module. The acquisition module is configured to acquire image data, where the image data is image data obtained by a camera through photographing in a video recording process: and the processing module is configured to: store the image data in a first queue if the image data is data acquired by the camera based on triggering of a user: and store the image data in a second queue if the image data is data acquired by the camera through automatic triggering, where the first queue and the second queue are different queues.

With reference to the second aspect, in some implementations of the second aspect, the processing module is further configured to: determine whether the image data is associated with identification data, where the identification data is used for indicating that the image data is the data acquired by the camera through automatic triggering: and determine, if the image data is associated with the identification data, that the image data is the data acquired by the camera through automatic triggering.

With reference to the second aspect, in some implementations of the second aspect, the processing module is further configured to: detect, in the video recording process of the camera, whether an image acquired by the camera meets an automatic triggering photographing condition; and generate, in a case that the image acquired by the camera meets the automatic triggering photographing condition, the image data according to the image acquired by the camera, and generate the identification data associated with the image data.

With reference to the second aspect, in some implementations of the second aspect, the acquisition module is further configured to: read first image data in the first queue or the second queue to generate a first image.

With reference to the second aspect, in some implementations of the second aspect, each piece of image data in the first queue and the second queue includes start time information, image information, and end time information: and the acquisition module is further configured to: after reading the start time information, the image information, and the end time information in the first image data from a queue in which the first image data is located, read second image data in the first queue or the second queue to generate a second image.

With reference to the second aspect, in some implementations of the second aspect, the acquisition module is further configured to: acquire an acquisition time of a first piece of image data in the first queue, to obtain first time information: and acquire an acquisition time of a first piece of image data in the second queue, to obtain second time information: the processing module is further configured to: compare a chronological order of the first time information and the second time information: and the acquisition module is further configured to: read, if the first time information is earlier than the second time information, the first piece of image data in the first queue as the second image data, to generate the second image: and read, if the second time information is earlier than the first time information, the first piece of image data in the second queue as the second image data, to generate the second image.

According to a third aspect, this application provides an electronic device, including a processor. The processor is coupled to a memory, and may be configured to execute instructions in the memory, to implement the method according to any possible implementation of the first aspect. Optionally, the electronic device further includes the memory: Optionally, the electronic device further includes a communication interface, and the processor is coupled to the communication interface.

According to a fourth aspect, this application provides a processor, including an input circuit, an output circuit, and a processing circuit. The processing circuit is configured to receive a signal by using the input circuit and transmit a signal by using the output circuit, so that the processor performs the method according to any possible implementation of the first aspect.

In a specific implementation process, the processor may be a chip, the input circuit may be an input pin, the output circuit may be an output pin, and the processing circuit may be a transistor, a gate circuit, a trigger, any logic circuit, or the like. An input signal received by the input circuit may be received and inputted by, for example, but not limited to, a receiver, a signal outputted by the output circuit may be, for example, but not limited to, a signal outputted to a transmitter and transmitted by the transmitter. In addition, the input circuit and the output circuit may be a same circuit, the circuit is used as an input circuit and an output circuit respectively at different moments. Specific implementations of the processor and the various circuits are not limited in this application.

According to a fifth aspect, this application provides a processing apparatus, including a processor and a memory. The processor is configured to read instructions stored in the memory, and can receive a signal through the receiver and transmit a signal through the transmitter to perform the method according to any possible implementation of the first aspect.

Optionally, there are one or more processors, and there are one or more memories.

Optionally, the memory may be integrated with the processor, or the memory and the processor may be disposed separately.

In a specific implementation process, the memory may be a non-transitory (non-transitory) memory such as a read only memory (read only memory, ROM), and the memory and the processor may be integrated on a same chip, or may be arranged on different chips respectively. A type of the memory and an arrangement manner of the memory and the processor are not limited in this embodiment of this application.

It should be understood that, a related data exchange process, for example, sending indication information, may be a process of outputting indication information from the processor, and receiving capability information may be a process of receiving input capability information by the processor. Specifically, data outputted by the processor may be outputted to the transmitter, and input data received by the processor may be from the receiver. The transmitter and the receiver may be collectively referred to as a transceiver.

The processing apparatus according to the fifth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory, where the memory may be integrated into the processor, or may be located outside the processor and exist independently.

According to a sixth aspect, this application provides a computer-readable storage medium. The computer-readable storage medium stores a computer program (which may also be referred to as code or an instruction). When the computer program is run on a computer, the computer is enabled to perform the method according to any possible implementation of the first aspect.

According to a seventh aspect, this application provides a computer program product. The computer program product includes a computer program (which may also be referred to as code or an instruction). When the computer program is run, the computer is enabled to perform the method according to any possible implementation of the first aspect.

DESCRIPTION OF EMBODIMENTS

The following describes technical solutions of this application with reference to accompanying drawings.

To clearly describe technical solutions in embodiments of this application, terms such as "first" and "second" are used in the embodiments of this application to distinguish between same items or similar items that have basically the same functions or purposes. For example, a first queue and a second queue are intended to distinguish between different queues, but not to limit a sequence thereof. Those skilled in the art may understand that the words "first", "second" and the like do not limit the quantity and execution order, and the words "first", "second" and the like are not limited to be necessarily different.

It should be noted that, in this application, words such as "for example" or "such as" are used to indicate an example, illustration, or description. Any embodiment or design solution described as "for example" or "such as" in this application should not be construed as being more preferable or more advantageous than other embodiments or design solutions. Specifically, use of the words such as "for example" or "such as" is intended to present related concepts in a specific manner.

In addition, "at least one" means one or more and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof indicates any combination of these items, including a single item or any combination of a plurality of items. For example, "at least one of a, b, or c" may represent a, b, c, a and b, a and c, b and c, or a, b, and c, where a, b, and c may be singular or plural.

Generally, the camera application of the mobile phone may include functions such as video recording and photographing. The video recording function of the mobile phone can help the user record a period of wonderful and unforgettable time, and the photographing function of the mobile phone can help the user record wonderful moments. In the video recording process, the mobile phone can support the user to take photos by triggering a photographing button during video recording, and can support the user to view the captured photos in the camera application.

Figure 1:
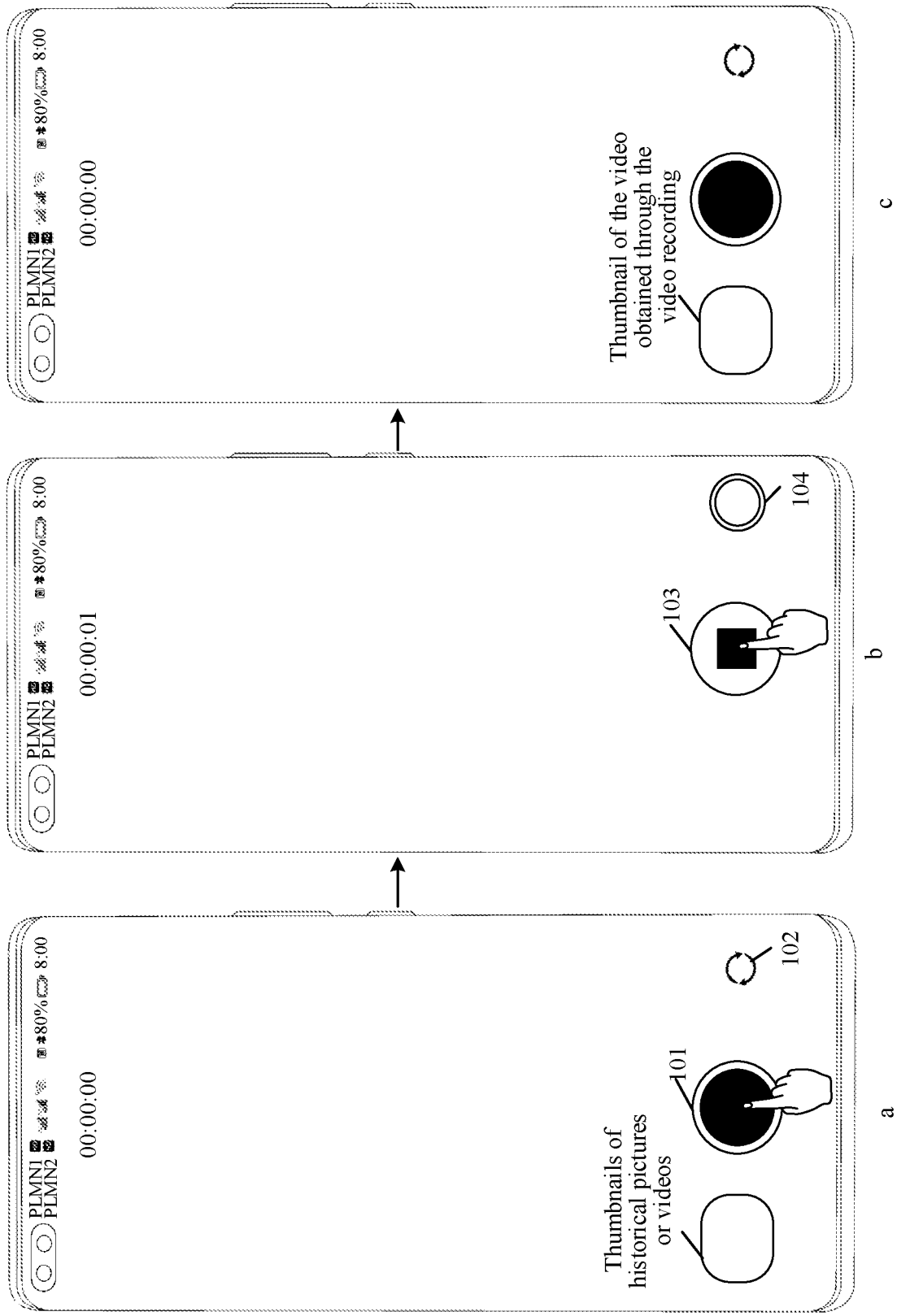
FIG. 1 is a schematic diagram of video recording by a mobile phone.

For example, FIG. 1 is a schematic diagram of video recording by a mobile phone. As shown in FIG. 1, the interface a in FIG. 1 is an interface before the mobile phone performs video recording, and the video recording has not started at this time, so that a duration for the video recording displayed on the interface is 00:00:00, and 00:00:00 is used for representing 0 hour, 0 minute, and 0 second. An icon 101 for starting video recording and a flipping icon 102 are further displayed on the interface. The user may start a camera of the mobile phone to start video recording by clicking the icon 101 for starting video recording, and may switch the camera for video recording by clicking the flipping icon 102. In addition, thumbnails of historical pictures or videos, that is, thumbnails of photos obtained by the user through a photographing function of the camera application or thumbnails of videos obtained through a video recording function of the camera application before this, are further displayed in the lower left corner of the interface.

On the interface a in FIG. 1, after detecting that the user triggers a control corresponding to the icon 101 for starting video recording, the mobile phone starts video recording through the camera of the mobile phone, as shown in the interface b in FIG. 1. An icon 103 for ending video recording and a photographing button 104 are displayed on an interface b in FIG. 1. The user may end the video recording by clicking the icon 103 for ending video recording, and may take a photo during the video recording by clicking the photographing button 104. Timing starts after the mobile phone performs video recording, and a duration for the video recording displayed on the interface b in FIG. 1 is 00:00:01, where 00:00:01 is used for representing that the video has been recorded for one second at this time.

In the video recording process, after detecting that the user triggers a control corresponding to the photographing button 104, the mobile phone may take a photo through the camera of the mobile phone to obtain the photo, and transmits the photo to the camera application for the user to view: After detecting that the user triggers a control corresponding to the icon 103 for ending video recording, the mobile phone may display an interface c in FIG. 1. As shown in the interface c in FIG. 1, a thumbnail of the video obtained through the video recording may be displayed in the lower left corner of the interface. The user may click the thumbnail in the lower left corner of the interface to view the video obtained through the video recording, and may also slide left on the video viewing interface to view the photos captured in the video recording process.

Figure 2:
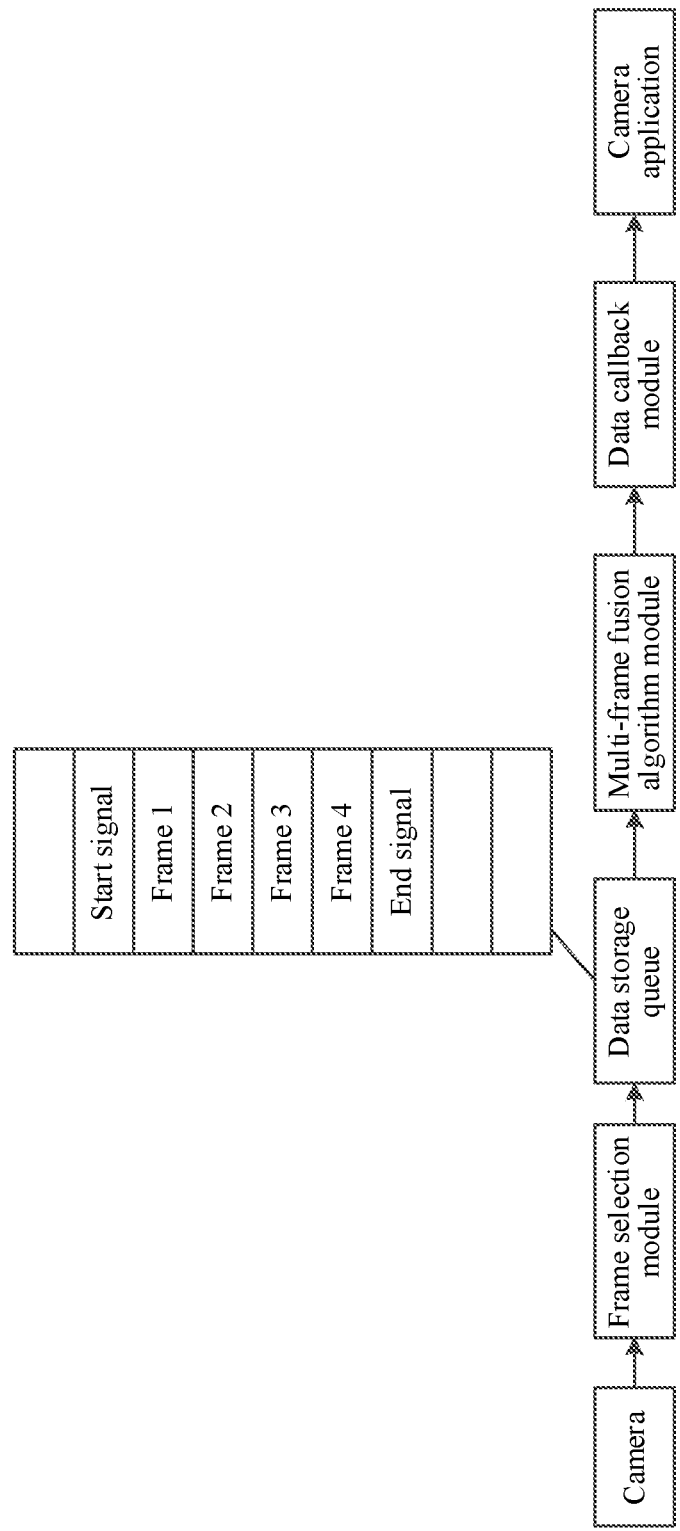
FIG. 2 is a schematic block diagram of transmitting a photo to a camera application by a mobile phone.

That the mobile phone takes a photo through the camera of the mobile phone to obtain the photo, and transmits the photo to the camera application may include a plurality of steps. FIG. 2 is a schematic block diagram of transmitting a photo to a camera application by a mobile phone. As shown in FIG. 2, the mobile phone takes a photo through the camera to obtain image data, and sends the image data to a frame selection module. Correspondingly, the frame selection module receives the image data, performs frame selection according to the image data to obtain a plurality of pieces of frame data, and adds a start signal and an end signal, where the plurality of pieces of frame data are used for generating an image. The frame selection module may sequentially send the start signal, the plurality of pieces of frame data, and the end signal to a data storage queue, and correspondingly, the data storage queue receives the data sent by the frame selection module. The data storage queue may include a plurality of storage spaces, where the plurality of storage spaces are configured for storing received data. As shown in FIG. 2, the plurality of pieces of frame data may include 4 pieces of frame data, which are a frame 1, a frame 2, a frame 3 and a frame 4 respectively. The frame selection module may sequentially send the start signal, the frame 1, the frame 2, the frame 3, the frame 4, and the end signal to the data storage queue, and the data storage queue receives these data and sequentially stores these data in the storage spaces in the order of receipt.

A working mechanism of the data storage queue is first-in-first-out, and the start signal, the frame 1, the frame 2, the frame 3, the frame 4, and the end signal may be sequentially sent to a multi-frame fusion algorithm module according to this working mechanism. The multi-frame fusion algorithm module may receive these data, and when the start signal is detected, fuses the plurality of pieces of frame data (that is, the frame 1, the frame 2, the frame 3, and the frame 4) to obtain a photo, and sends the photo to a data callback module. Correspondingly, the data callback module receives the photo, and sends the photo to the camera application.

In order to improve the competitiveness of the mobile phone, the mobile phone can not only support the user to take photos by triggering the photographing button during video recording, but also support automatic photographing during video recording, so as to better meet different needs of the user.

For example, a camera active triggering function may be added to the mobile phone in the video recording process. Compared with the process shown in FIG. 2 above, a scene detection algorithm may further be added to the mobile phone, for detecting whether a current scene is meaningful for taking photos. Specifically, in the video recording process, the mobile phone may analyze a video recording preview stream in real time through the scene detection algorithm to determine whether the current scene is meaningful for taking photos, and if a triggering condition is met, actively acquire image data from the frame selection module and send the image data to the multi-frame fusion algorithm module to obtain a photo.

In the video recording process, the mobile phone can support the user to take photos by triggering the photographing button, and can also support automatic photographing. There is a high probability that a moment at which the user triggers the photographing button is close to an automatic photographing moment. In a case that the moment at which the user triggers the photographing button is close to the automatic photographing moment, in a process in which the image data obtained in these two cases is transmitted to data storage queues, the image data may be transmitted simultaneously, which causes data stored in the data storage queues to be confused, and the integrity of the image data used for generating a photo to be broken, consequently causing a processing exception of the multi-frame fusion algorithm, and making it impossible to generate a photo.

Figure 3:
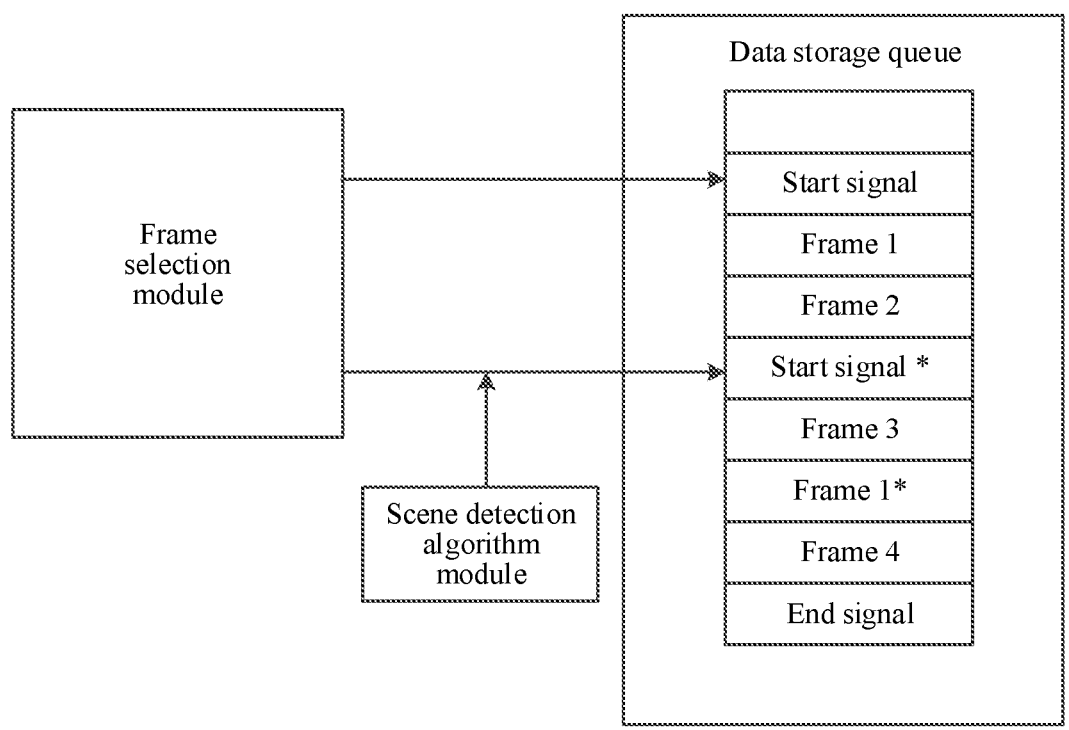
FIG. 3 is a schematic diagram of storing image data according to an embodiment of this application.

For example, FIG. 3 is a schematic diagram of storing image data. As shown in FIG. 3, the frame selection module in the mobile phone first sends the image data obtained by triggering the photographing button by the user to the data storage queue. The image data obtained by triggering the photographing button by the user includes the start signal, the frame 1, the frame 2, the frame 3, the frame 4, and the end signal. When the data storage queue is transmitted to the frame 3, the scene detection algorithm detects that the current scene is meaningful for taking photos, and the frame selection module transmits the image data obtained through automatic photographing to the data storage queue. The image data obtained through automatic photographing may include a start signal *, a frame 1 *, a frame 2 *, a frame 3 *, and an end signal *. The image data currently obtained by triggering the photographing button by the user has not been transmitted yet. The time point of the frame 3 is the same as the time point of the start signal *. Confusion will occur when the data storage queue stores the data. There may be a case that the start signal * is stored first and then the frame 1* is stored, and there may be a subsequent case that the frame 1* is stored, and then frame 4 and the end signal are stored, causing the data storage queue to store data in an out-of-order manner, and the integrity of the image data used for generating a photo to be broken.

In view of this, the embodiments of this application provide an image data processing method and an electronic device. In the video recording process, image data captured by triggering a photographing button by a user and image data acquired through automatic photographing can be stored orderly, which helps ensure the integrity of the image data.

The image data processing method provided in the embodiments of this application may be applied to an electronic device, for example, the foregoing mobile phone. In addition, the electronic device involved in the embodiments of this application may alternatively be a wearable electronic device, for example, a tablet computer, a personal computer (personal computer, PC), or a smartwatch, or may be various teaching aids (such as a learning machine and an early education machine), a smart toy, a portable robot, a personal digital assistant (personal digital assistant, PDA), an augmented reality (augmented reality, AR) device, and a virtual reality (virtual reality, VR) device, or the like.

Figure 4:
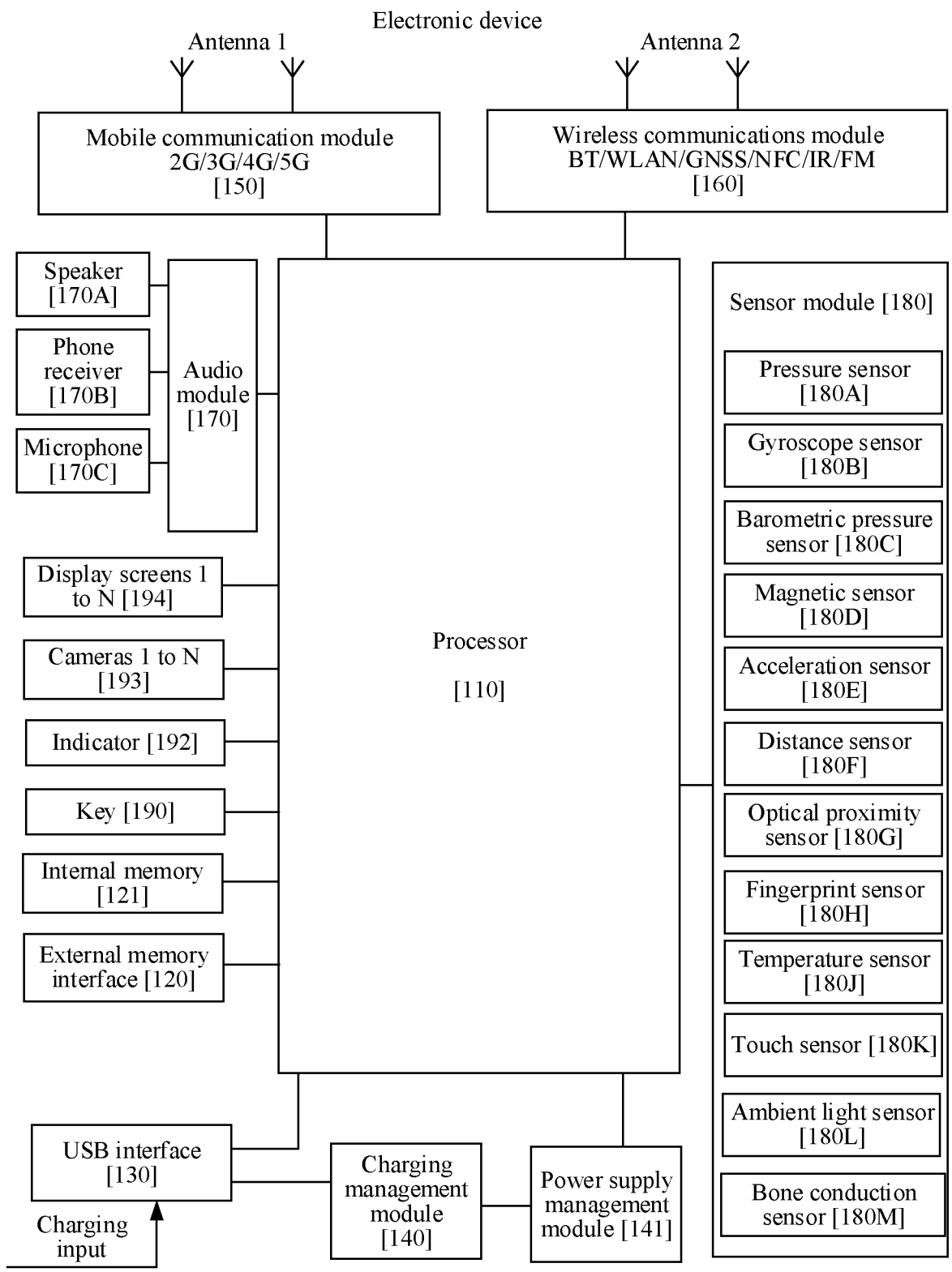
FIG. 4 is a schematic diagram of a hardware structure of an electronic device according to an embodiment of this application.

To help better understand embodiments of this application, the following describes a hardware structure of an electronic device in the embodiments of this application. For example, FIG. 4 is a schematic structural diagram of an electronic device according to an embodiment of this application.

The electronic device may include a processor 110, an external memory interface 120, an internal memory 121, a universal serial bus (USB) interface 130, a charging management module 140, a power management module 141, an antenna 1, an antenna 2, a mobile communication module 150, a wireless communication module 160, an audio module 170, a speaker 170A, a phone receiver 170B, a microphone 170C, a sensor module 180, a key 190, an indicator 192, a camera 193, a display screen 194, and the like.

Optionally, the sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device. In other embodiments of this application, the electronic device may include more or fewer components than those shown in the figure, or combine some components, or split some components, or have different component arrangements. The components in the portrait may be implemented by hardware, software, or a combination of software and hardware.

The processor 110 may include one or more processing unit. Different processing units may be separate devices, or may be integrated into one or more processors. A memory may also be disposed in the processor 110, configured to store instructions and data.

The USB interface 130 is an interface that conforms to the USB standard specification, and may be specifically a Mini USB interface, a Micro USB interface, a USB Type C interface, or the like. The USB interface 130 may be configured to connect to the charger to charge the electronic device, or may be configured for data transmission between the electronic device and a peripheral device, or may be configured to connect to a headset, to play audio through the headset. The interface may alternatively be configured to be connected to another electronic device such as an AR device.

The charging management module 140 is configured to receive charging input from the charger. The charger may be a wireless charger, or may be a wired charger. The power management module 141 is configured to connect the charging management module 140 and the processor 110.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. The antennas in the electronic device may be configured to cover one or more communication bands. Different antennas may be multiplexed to improve antenna utilization.

The mobile communication module 150 may provide a solution to wireless communication such as 2G/3G/4G/5G applied to the electronic device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation.

The wireless communication module 160 may provide a solution for wireless communication including wireless local area networks (WLAN) (such as a wireless fidelity (Wi-Fi) network), Bluetooth (BT), a global navigation satellite system (GNSS), frequency modulation (FM), and the like to be applied to the electronic device.

The electronic device implements a display function through the GPU, the display screen 194, the application processor, and the like. The GPU is a microprocessor for image processing, and is connected to the display screen 194 and the application processor. The GPU is configured to perform mathematical and geometric calculation, and is configured to render an image.

The display screen 194 is configured to display an image, a video, and the like. The display screen 194 includes a display panel. In some embodiments, the electronic device may include one or N display screens 194, and N is a positive integer greater than 1.

The electronic device may implement a photographing function by using the ISP, the camera 193, the video codec, the GPU, the display screen 194, the application processor, and the like.

The camera 193 is configured to capture a static image or a video. In some embodiments, the electronic device may include 1 or N cameras 193, where N is a positive integer greater than 1.

The external memory interface 120 may be configured to connect to an external storage card, for example, a micro SD card, to expand a storage capability of the electronic device. The external storage card communicates with the processor 110 by using the external memory interface 120, to implement a data storage function. For example, a file such as a music or a video is stored in the external storage card.

The internal memory 121 may be configured to store computer executable program code, where the executable program code includes an instruction. The internal memory 121 may include a program storage area and a data storage area.

The electronic device may implement an audio function through the audio module 170, the speaker 170A, the phone receiver 170B, the microphone 170C, the application processor, and the like. The audio function is, for example, music playback and sound recording.

The audio module 170 is configured to convert digital audio information into analog audio signal output, and is also configured to convert analog audio input into a digital audio signal. The speaker 170A, also referred to as a "speaker", is configured to convert an audio electrical signal into a sound signal. The electronic device may be configured to listen to music or a hands-free call by using the speaker 170A. The phone receiver 170B, also referred to as a "handset", is configured to convert an audio electrical signal into a sound signal. When the electronic device receives a call or a voice message, the receiver 170B can be placed near a person's ear to answer the voice. The microphone 170C, also referred to as a "microphone" or a "megaphone", is configured to convert a sound signal into an electrical signal.

The pressure sensor 180A is configured to sense a pressure signal, and can convert the pressure signal into an electrical signal. In some embodiments, the pressure sensor 180A may be disposed on the display screen 194. A gyroscope sensor 180B may be configured to determine a motion posture of the electronic device. The barometric pressure sensor 180C is configured to measure barometric pressure. The magnetic sensor 180D includes a Hall sensor. The acceleration sensor 180E may detect magnitudes of acceleration of the electronic device in various directions (generally on three axes). The distance sensor 180F is configured to measure a distance. The optical proximity sensor 180G may include, for example, a light-emitting diode (LED) and an optical detector such as a photodiode. The ambient light sensor 180L is configured to perceive ambient light brightness. The fingerprint sensor 180H is configured to collect a fingerprint. The temperature sensor 180J is configured to detect a temperature. The touch sensor 180K is also referred to as a "touch device". The touch sensor 180K may be disposed in the display screen 194, and the touch sensor 180K and the display screen 194 constitute a "touchscreen". The bone conduction sensor 180M may collect a vibration signal.

The key 190 includes a start key, a volume key, and the like. The key 190 may be a mechanical key, or a touch-type key. The electronic device may receive a key input, and generate a key signal input related to user setting and function control of the electronic device. The indicator 192 may be an indicator light that may be configured to indicate a charging state and a power change, or may be configured to indicate a message, a missed call, a notification, and the like.

A software system of the electronic device may use a hierarchical architecture, an event-driven architecture, a microkernel architecture, a microservice architecture, or a cloud architecture. The hierarchical architecture may be an Android (Android) system, an Apple (IOS) system, or another operating system. This is not limited in this embodiment of this application.

Figure 5:
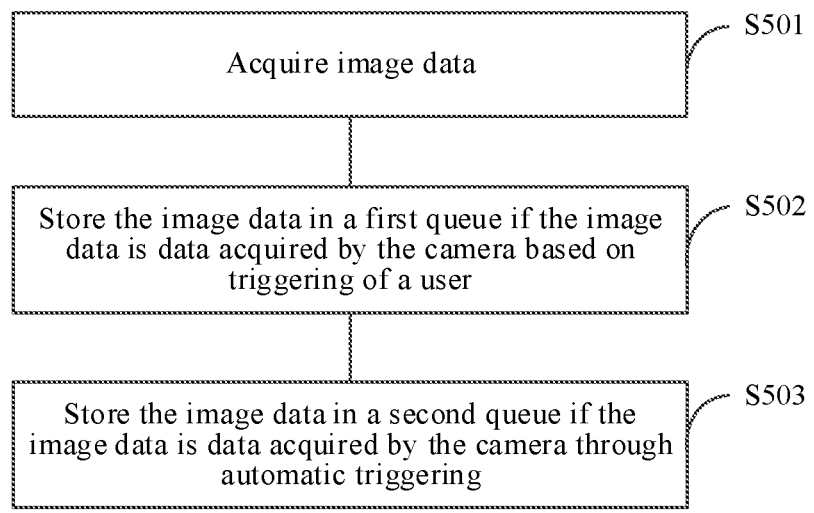
FIG. 5 is a schematic flowchart of an image data processing method according to an embodiment of this application.

FIG. 5 is a schematic diagram of an image data processing method 500 according to an embodiment of this application. The method may be applied to an electronic device. A diagram of a hardware structure of the electronic device may be shown in FIG. 4, but this is not limited in this embodiment of this application. The method 500 may be applicable to the scenario shown in FIG. 1, but this is not limited in this embodiment of this application.

The method 500 may include the following steps.

S501: Acquire image data, where the image data is image data obtained by a camera through photographing in a video recording process.

The electronic device may include a camera, or may not include a camera, which is not limited in this embodiment of this application.

When the electronic device includes a camera, the electronic device can perform video recording through the camera, the camera can take photos in the video recording process, and the electronic device can acquire image data through the camera.

In this case, the manner of acquiring the image data by the electronic device is relatively simple and easy to implement.

When the electronic device does not include a camera, the data obtained by the camera through photographing in the video recording process needs to be transmitted to the electronic device, and the electronic device receives the image data from the camera.

In this case, the electronic device is simple in structure and is low in cost.

There may be two manners for triggering the camera to take photos in the video recording process: one triggering manner is user triggering, and the other triggering manner is automatic triggering.

S502: Store the image data in a first queue if the image data is data acquired by the camera based on triggering of a user.

The first queue may also be referred to as a first storage queue or a first data storage queue, which is not limited in this embodiment of this application.

The first queue is used for storing data acquired by the camera based on triggering of the user. When determining that the image data is data acquired by the camera based on triggering of the user, the electronic device may store the image data in the first queue.

S503: Store the image data in a second queue if the image data is data acquired by the camera through automatic triggering, where the first queue and the second queue are different queues.

The second queue may also be referred to as a second storage queue or a second data storage queue, which is not limited in this embodiment of this application.

The second queue is used for storing data acquired by the camera through automatic triggering. When determining that the image data is data acquired by the camera through automatic triggering, the electronic device may store the image data in the second queue.

The first queue and the second queue are two different queues, that is, different queues are used to respectively store the data acquired by the camera based on triggering of the user and the data acquired by the camera through automatic triggering.

According to the image data processing method provided in this embodiment of this application, the data acquired by the camera based on triggering of the user and the data acquired by the camera through automatic triggering are respectively stored by using different queues in the video recording process, which can avoid out-of-order storage when the image data is stored, and can achieve the effect of orderly saving the data acquired based on triggering of the user and the data acquired through automatic triggering, thereby helping ensure the integrity of the image data.

In an optional embodiment, the electronic device may use identification data to distinguish the data acquired by the camera based on triggering of the user and the data acquired by the camera through automatic triggering. In this case, there are a plurality of possible implementations.

In a first possible implementation, the data acquired by the camera based on triggering of the user is not associated with the identification data, and the data acquired by the camera through automatic triggering is associated with the identification data. The identification data is used for indicating automatic triggering.

The identification data may also be referred to as an identifier or identification information, which is not limited in this embodiment of this application.

Specifically, the electronic device may determine whether the image data is associated with the identification data. If the image data is associated with the identification data, the electronic device may determine that the image data is data acquired by the camera through automatic triggering: and correspondingly, if the image data is not associated with the identification data, the electronic device may determine that the image data is data acquired by the camera based on triggering of the user.

In this implementation, in the video recording process, based on that the electronic device supports a user triggering photographing function, a function that the camera automatically triggers photographing is added, and the original data storage manner may not be changed. In the original manner, identification data is merely associated with the data acquired through automatic triggering, and the data is stored in the second queue different from the first queue based on the identification data, which can avoid out-of-order storage when the image data is stored, and can achieve the effect of orderly saving the data acquired based on triggering of the user and the data acquired through automatic triggering, thereby helping ensure the integrity of the image data.

In a second possible implementation, the data acquired by the camera based on triggering of the user is associated with first identification data, and the data acquired by the camera through automatic triggering is associated with second identification data. The first identification data is used for indicating user triggering, and the second identification data is used for indicating automatic triggering.

Specifically, the electronic device may detect the identification data associated with the image data. If the image data is associated with the first identification data, the electronic device may determine that the image data is data acquired by the camera based on triggering of the user: and correspondingly, if the image data is associated with the second identification data, the electronic device may determine that the image data is data acquired by the camera through automatic triggering.

In this implementation, in the video recording process, the electronic device can support the user triggering photographing function and the automatic triggering photographing function, and the image data acquired based on different photographing manners is associated with different identification data, so as to be stored in different queues, which can avoid out-of-order storage when the image data is stored, and can achieve the effect of orderly saving the data acquired based on triggering of the user and the data acquired through automatic triggering, thereby helping ensure the integrity of the image data.

In a third possible implementation, the data acquired by the camera based on triggering of the user is associated with the identification data, and the data acquired by the camera through automatic triggering is not associated with the identification data. The identification data is used for indicating user triggering.

In this implementation, in the video recording process, based on that the electronic device supports a user triggering photographing function, a function that the camera automatically triggers photographing is added. To distinguish the image data acquired based on different photographing manners, identification data is associated with the image data acquired based on the original manner, and the image data is stored in the first queue: and a storage queue, that is, the second queue, is added for the image data acquired in a newly added manner, and the image data is stored in the second queue, which can avoid out-of-order storage when the image data is stored, and can achieve the effect of orderly saving the data acquired based on triggering of the user and the data acquired through automatic triggering, thereby helping ensure the integrity of the image data.

In an optional embodiment, the acquiring image data in S501 may include: detecting, in the video recording process of the camera, whether an image acquired by the camera meets an automatic triggering photographing condition; and generating, in a case that the image acquired by the camera meets the automatic triggering photographing condition, the image data according to the image acquired by the camera, and generating the identification data associated with the image data.

The automatic triggering photographing condition may be an automatic triggering photographing condition involved in the existing manner, which is not limited in this embodiment of this application.

In a case that the image acquired by the camera meets the automatic triggering photographing condition, the electronic device may acquire an image through the camera to obtain image data, and generates identification data associated with the image data. The identification data is used for indicating automatic triggering.

The identification data may alternatively be understood to be used for indicating that the image data is the data acquired by the camera through automatic triggering, which is not limited in this embodiment of this application.

The processes of acquiring image data and storing the image data are described above in detail, and the process of generating an image based on the stored image data will be described below in detail.

The image data processing method 500 provided in this embodiment of this application may further include: reading first image data in the first queue or the second queue to generate a first image.

A storage mechanism of each of the first queue and the second queue is first-in-first-out, that is, image data stored first is read first.

Image data is stored in both the first queue and the second queue, and the electronic device may determine a queue for reading image data according to the sequence of acquisition times of the image data.

The first image data is the image data with the earliest acquisition time in the two queues, and the electronic device may read the first image data to generate the first image.

According to the image data processing method provided in this embodiment of this application, the queue for reading image data is determined according to the sequence of acquisition times of the image data in the first queue and the second queue, which helps ensure the orderliness of data reading.

In an optional embodiment, each piece of image data in the first queue and the second queue includes start time information, image information, and end time information; and The process in which the electronic device generates the first image according to the first image data may include: after reading the start time information, the image information, and the end time information in the first image data from a queue in which the first image data is located, reading second image data in the first queue or the second queue to generate a second image.

The start time information may also be referred to as a start signal, the image information may also be referred to as a plurality of pieces of frame data, and the end time information may also be referred to as an end signal, which is not limited in this embodiment of this application.

After reading the end time information of the first image data, the electronic device determines the second image data again according to the acquisition times of the image data in the first queue and the second queue, and generates the second image according to the second image data.

It should be understood that, the method for the electronic device to generate the second image according to the second image data is the same as the method for generating the first image, and details are not described herein again.

According to the image data processing method provided in this embodiment of this application, during reading of image data, only after all the information of one piece of image data is read, the next piece of image data is read, which can improve the accuracy of subsequent generated images, and helps ensure the orderliness of data processing.

Optionally, the reading second image data in the first queue or the second queue to generate a second image may include: acquiring an acquisition time of a first piece of image data in the first queue, to obtain first time information: acquiring an acquisition time of a first piece of image data in the second queue, to obtain second time information: comparing a chronological order of the first time information and the second time information: reading, if the first time information is earlier than the second time information, the first piece of image data in the first queue as the second image data, to generate the second image: and reading, if the second time information is earlier than the first time information, the first piece of image data in the second queue as the second image data, to generate the second image.

The first piece of image data in the first queue is the earliest stored in the first queue, and the first piece of image data in the second queue is the earliest stored in the second queue. According to the first-in-first-out principle, the electronic device may read the first piece of image data in the first queue or the first piece of image data in the second queue.

The electronic device may determine a queue for reading the second image data according to the sequence of the acquisition times of the first piece of image data in the first queue and the first piece of image data in the second queue.

Specifically, the first time information corresponds to the acquisition time of the first piece of image data in the first queue, and the second time information corresponds to the acquisition time of the first piece of image data in the second queue. The electronic device may compare the chronological order of the first time information and the second time information, to determine the queue for reading the second image data.

It should be understood that, the acquisition time of the first piece of image data in the first queue may be the moment at which the user triggers photographing, and the acquisition time of the first piece of image data in the second queue may be the moment at which the camera automatically triggers photographing.

If the first time information is earlier than the second time information, that is, the acquisition time of the first piece of image data in the first queue is earlier than the acquisition time of the first piece of image data in the second queue, the electronic device reads the first piece of image data in the first queue as the second image data, to generate the second image.

If the second time information is earlier than the first time information, that is, the acquisition time of the first piece of image data in the second queue is earlier than the acquisition time of the first piece of image data in the first queue, the electronic device reads the first piece of image data in the second queue as the second image data, to generate the second image.

In addition, if the first time information is the same as the second time information, the image data is read according to a preset priority.

For example, if the preset priority is that a priority of the first queue is higher than a priority of the second queue, the electronic device reads the first piece of image data of the first queue. If the preset priority is that the priority of the second queue is higher than the priority of the first queue, the electronic device reads the first piece of image data of the second queue.

Figure 6:
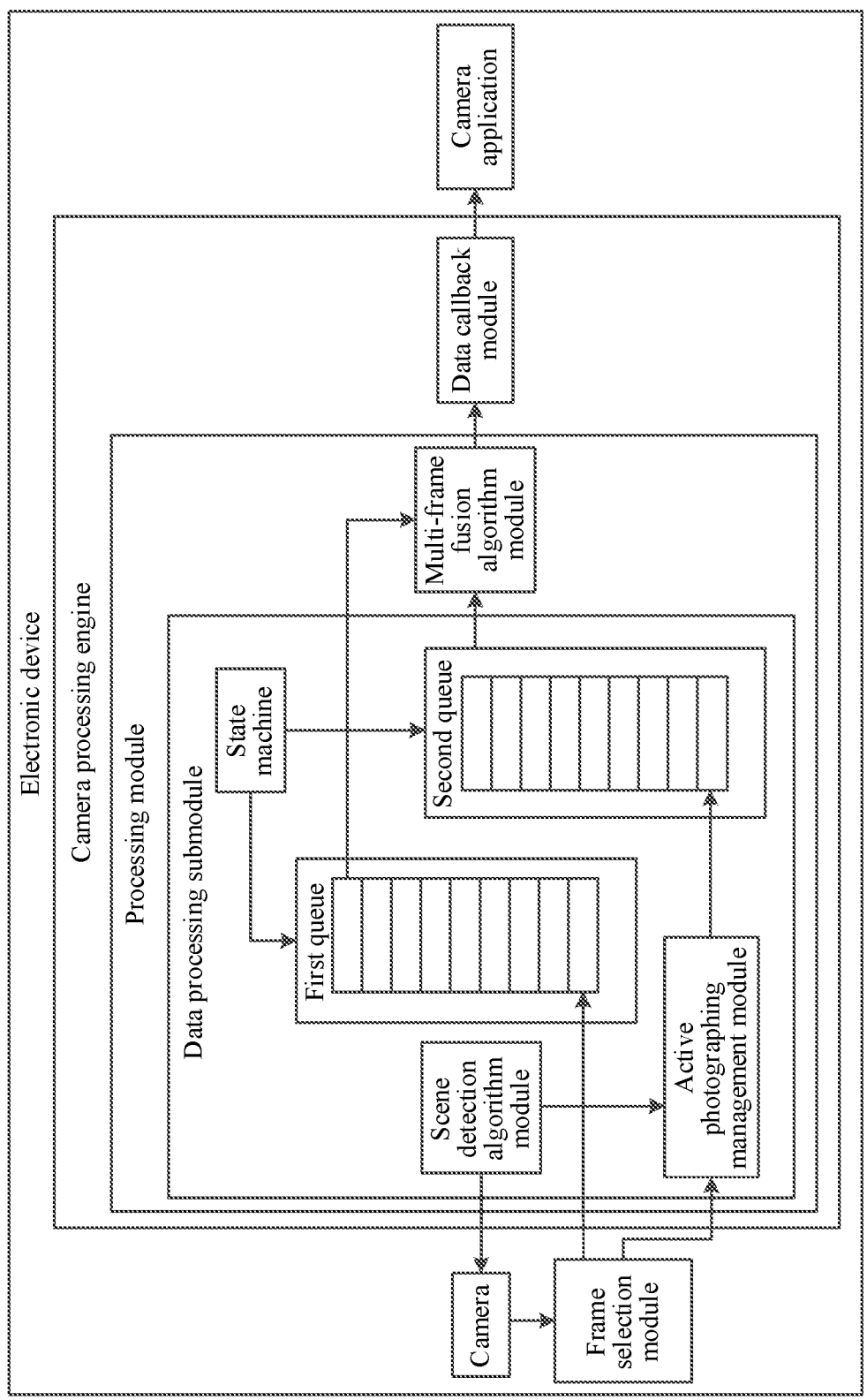
FIG. 6 is a schematic diagram of an electronic device according to an embodiment of this application.

An embodiment of this application further provides an electronic device, and the image data processing method provided in the embodiments of this application may be applied to the electronic device. FIG. 6 is a schematic block diagram of an electronic device. As shown in FIG. 6, the electronic device may include a camera, a frame selection module, a camera processing engine, and a camera application. The camera processing engine may include a processing module and a data callback module. The processing module includes a data processing submodule and a multi-frame fusion algorithm module. The data processing submodule includes an active photographing management module, a scene detection algorithm module, a first queue, a second queue, and a state machine.

The scene detection algorithm is used for: when an image in the video recording process of the camera meets an automatic triggering photographing condition, controlling the camera to capture the image, and controlling the active photographing management module to associate identification data with the image data acquired through automatic triggering.

The camera is configured to perform video recording, and in the video recording process, may acquire image data based on triggering of a user and acquire image data through automatic triggering, and send the acquired image data to the frame selection module.

The frame selection module is configured to: receive the image data from the camera, perform frame selection according to the image data to obtain a plurality of pieces of frame data, add a start signal and an end signal, where the plurality of pieces of frame data are used for generating an image (or a photo), and send the start signal, the plurality of pieces of frame data, and the end signal to the first queue or the second queue.

The active photographing management module is configured to: associate identification data with the image data acquired through automatic triggering.

The state machine is configured to control an output of image data of the first queue and the second queue according to a sequence of acquisition times of the image data in the first queue and the second queue, and before the image data of one of the first queue or the second queue is outputted to the end signal, the state machine controls the other queue to not output data.

For example, when the acquisition time of a first piece of image data in the first queue is earlier than the acquisition time of a first piece of image data in the second queue, the state machine controls the first piece of image data in the first queue to be outputted first, and before the image data in the first queue is outputted to the end signal, the state machine controls the second queue not to output the image data.

In addition, when the acquisition times of the first pieces of image data in the first queue and the second queue are the same, the state machine may control the output of the image data in the first queue and the second queue according to a preset priority.

The multi-frame fusion algorithm module is configured to: read the image data in the first queue or the second queue, fuse the plurality of pieces of frame data in the image data to obtain an image, and send the image to the data callback module.

The data callback module is configured to: receive the image from the multi-frame fusion algorithm module, and send the image to the camera application.

The camera application is configured to: display the image from the data callback module.

The electronic device provided in this embodiment of this application can store image data acquired based on different manners through different queues, which helps ensure the integrity of data processing. In addition, a state machine is used to control the output of image data in the queues, which helps ensure the orderliness of data processing.

Sequence numbers of the foregoing processes do not mean execution sequences. The execution sequences of the processes should be determined based on functions and internal logic of the processes, and should not be construed as any limitation on the implementation processes of embodiments of this application.

The foregoing describes in detail the image data processing method provided in the embodiments of this application with reference to FIG. 1 to FIG. 6. The following describes in detail the electronic device provided in the embodiments of this application with reference to FIG. 7 and FIG. 8.

An embodiment of this application provides an electronic device 700. The electronic device 700 includes an acquisition module 710 and a processing module 720. The acquisition module 710 is configured to acquire image data, where the image data is image data obtained by a camera through photographing in a video recording process; and the processing module 720 is configured to: store the image data in a first queue if the image data is data acquired by the camera based on triggering of a user: and store the image data in a second queue if the image data is data acquired by the camera through automatic triggering, where the first queue and the second queue are different queues.

Optionally, the processing module 720 is further configured to: determine whether the image data is associated with identification data, where the identification data is used for indicating that the image data is the data acquired by the camera through automatic triggering: and determine, if the image data is associated with the identification data, that the image data is the data acquired by the camera through automatic triggering.

Optionally, the processing module 720 is further configured to: detect, in the video recording process of the camera, whether an image acquired by the camera meets an automatic triggering photographing condition; and generate, in a case that the image acquired by the camera meets the automatic triggering photographing condition, the image data according to the image acquired by the camera, and generate the identification data associated with the image data.

Optionally, the acquisition module 710 is further configured to: read first image data in the first queue or the second queue to generate a first image.

Optionally, each piece of image data in the first queue and the second queue includes start time information, image information, and end time information; and the acquisition module 710 is further configured to: after reading the start time information, the image information, and the end time information in the first image data from a queue in which the first image data is located, read second image data in the first queue or the second queue to generate a second image.

Optionally, the acquisition module 710 is further configured to: acquire an acquisition time of a first piece of image data in the first queue, to obtain first time information: and acquire an acquisition time of a first piece of image data in the second queue, to obtain second time information: the processing module is further configured to: compare a chronological order of the first time information and the second time information: and the acquisition module 710 is further configured to: read, if the first time information is earlier than the second time information, the first piece of image data in the first queue as the second image data, to generate the second image: and read, if the second time information is earlier than the first time information, the first piece of image data in the second queue as the second image data, to generate the second image.

It should be understood that, the electronic device 700 herein is embodied in the form of functional modules. The term "module" herein may be an application-specific integrated circuit (application-specific integrated circuit, ASIC), an electronic circuit, a processor (for example, a shared processor, a dedicated processor, or a set of processors) and a memory that execute one or more software programs or firmware programs, a combinational logic circuit, and/or other suitable components that support the described functions. In an optional example, a person skilled in the art may understand that the electronic device 700 may be specifically the electronic device in the method embodiments, or the function of the electronic device in the method embodiments may be integrated into the electronic device 700. The electronic device 700 may be configured to execute processes and/or steps corresponding to the electronic device in the method embodiments. To avoid repetition, details are not described herein again.

The electronic device 700 has functions of implementing corresponding steps performed by the electronic device in the foregoing method embodiments. The functions may be implemented by hardware, or may be implemented by hardware executing corresponding software. The hardware or software includes one or more modules corresponding to the functions.

Figure 7:
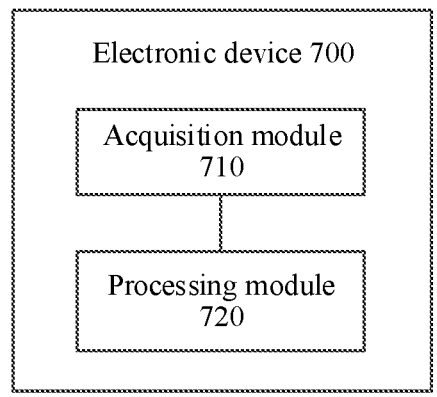
FIG. 7 is a schematic block diagram of an electronic device according to an embodiment of this application.

In this embodiment of this application, the electronic device 700 in FIG. 7 may alternatively be a chip or a chip system, for example, a system on chip (system on chip, SoC).

Figure 8:
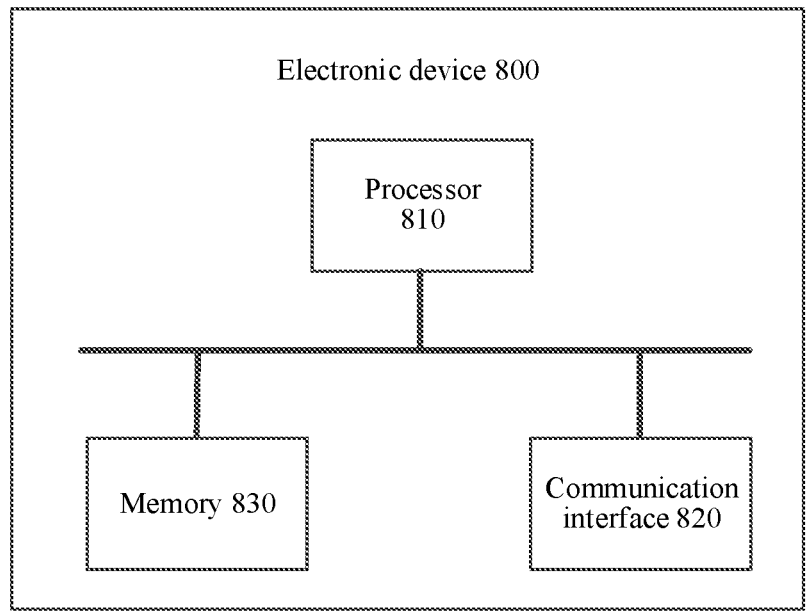
FIG. 8 is a schematic block diagram of another electronic device according to an embodiment of this application.

FIG. 8 is a schematic block diagram of another electronic device 800 according to an embodiment of this application. The electronic device 800 includes: a processor 810, a communication interface 820, and a memory 830. The processor 810, the communication interface 820, and the memory 830 communicate with each other through an internal connection path. The memory 830 is configured to store instructions. The processor 810 is configured to execute the instructions stored in the memory 830, so as to control the communication interface 820 to send a signal and/or receive a signal.

It should be understood that, the electronic device 800 may be specifically the electronic device in the foregoing method embodiments, or the functions of the electronic device in the foregoing method embodiments may be integrated into the electronic device 800. The electronic device 800 may be configured to execute steps and/or processes corresponding to the electronic device in the foregoing method embodiments. Optionally, the memory 830 may include a read-only memory and a random access memory, and provides instructions and data to the processor. A part of the memory may further include a non-volatile random access memory. For example, the memory may further store information of a device type. The processor 810 may be configured to execute the instructions stored in the memory. Further, when the processor executes the instructions, the processor may perform steps and/or processes corresponding to the electronic device in the foregoing method embodiments.

It should be understood that, in this embodiment of this application, the processor 810 may be a central processing unit (central Processing Unit, CPU), or the processor may be another general-purpose processor, a digital signal processor (DSP), an application-specific integrated circuit (ASIC), a field-programmable gate array (FPGA) or other programmable logic devices, a discrete gate or transistor logic device, a discrete hardware component, or the like. The general-purpose processor may be a microprocessor, or the processor may be any conventional processor and the like.

During implementation, the steps of the method may be performed by using an integrated logic circuit of hardware in the processor or by using instructions in a form of software. Steps of the methods disclosed with reference to the embodiments of this application may be directly performed and completed by using a hardware processor, or may be performed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor executes the instructions in the memory and completes the steps of the foregoing method in combination with hardware of the processor. To avoid repetition, details are not described herein again.

This application further provides a computer-readable storage medium. The computer-readable storage medium is configured to store a computer program, and the computer program is configured to implement the method corresponding to the electronic device in the foregoing method embodiments.

This application further provides a chip system, and the chip system is configured to support the electronic device in the foregoing method embodiments in implementing the functions shown in the embodiments of this application.

This application further provides a computer program product, and the computer program product includes a computer program (which may also be referred to as code or instructions). When the computer program runs on a computer, the computer may perform the method corresponding to the electronic device shown in the foregoing method embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

A person skilled in the art may clearly understand that, for simple and clear description, for specific work processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image data processing method, comprising:
   acquiring image data, wherein the image data is image data obtained by a camera through photographing in a video recording process;
   storing the image data in a first queue if the image data is data acquired by the camera based on triggering of a user;
   storing the image data in a second queue if the image data is data acquired by the camera through automatic triggering, wherein the first queue and the second queue are different queues, wherein each piece of image data in the first queue and the second queue comprises start time information, image information, and end time information; and
   after reading the start time information, the image information, and the end time information in the first image data from a queue in which the first image data is located, reading second image data in the first queue or the second queue to generate a second image.

2. The method according to claim 1, further comprising:
   determining whether the image data is associated with identification data, wherein the identification data is used for indicating that the image data is the data acquired by the camera through automatic triggering; and
   determining, if the image data is associated with the identification data, that the image data is the data acquired by the camera through automatic triggering.

3. The method according to claim 1, wherein the acquiring image data comprises:
   detecting, in the video recording process of the camera, whether an image acquired by the camera meets an automatic triggering photographing condition; and
   generating, in a case that the image acquired by the camera meets the automatic triggering photographing condition, the image data according to the image acquired by the camera, and generating the identification data associated with the image data.

4. The method according to claim 1, further comprising:
   reading first image data in the first queue or the second queue to generate a first image.

5. The method according to claim 1, wherein the reading second image data in the first queue or the second queue to generate a second image comprises:
   acquiring an acquisition time of a first piece of image data in the first queue, to obtain first time information;
   acquiring an acquisition time of a first piece of image data in the second queue, to obtain second time information;
   comparing a chronological order of the first time information and the second time information;
   reading, if the first time information is earlier than the second time information, the first piece of image data in the first queue as the second image data, to generate the second image; and
   reading, if the second time information is earlier than the first time information, the first piece of image data in the second queue as the second image data, to generate the second image.

6. An electronic device, comprising:
   an acquisition module, configured to acquire image data, wherein the image data is image data obtained by a camera through photographing in a video recording process;
   a processing module, configured to:
      store the image data in a first queue if the image data is data acquired by the camera based on triggering of a user;
      store the image data in a second queue if the image data is data acquired by the camera through automatic triggering, wherein the first queue and the second queue are different queues, wherein each piece of image data in the first queue and the second queue comprises start time information, image information, and end time information; and
   the acquisition module is configured to:
      after reading the start time information, the image information, and the end time information in the first image data from a queue in which the first image data is located, read second image data in the first queue or the second queue to generate a second image.

7. The electronic device according to claim 6, wherein the processing module is further configured to:
   determine whether the image data is associated with identification data, wherein the identification data is used for indicating that the image data is the data acquired by the camera through automatic triggering; and
   determine, if the image data is associated with the identification data, that the image data is the data acquired by the camera through automatic triggering.

8. The electronic device according to claim 6, wherein the processing module is further configured to:
   detect, in the video recording process of the camera, whether an image acquired by the camera meets an automatic triggering photographing condition; and
   generate, in a case that the image acquired by the camera meets the automatic triggering photographing condition, the image data according to the image acquired by the camera, and generate the identification data associated with the image data.

9. The electronic device according to claim 6, wherein the acquisition module is further configured to:
   read first image data in the first queue or the second queue to generate a first image.

10. The electronic device according to claim 6, wherein the acquisition module is further configured to:
   acquire an acquisition time of a first piece of image data in the first queue, to obtain first time information; and
   acquire an acquisition time of a first piece of image data in the second queue, to obtain second time information;
   the processing module is further configured to:
   compare a chronological order of the first time information and the second time information; and the acquisition module is further configured to:
read, if the first time information is earlier than the second time information, the first piece of image data in the first queue as the second image data, to generate the second image; and
read, if the second time information is earlier than the first time information, the first piece of image data in the second queue as the second image data, to generate the second image.

11. A non-transitory computer-readable storage medium, configured to store a computer program, wherein the computer program comprises instructions for execution by at least one processor to perform operations comprising:
acquiring image data, wherein the image data is image data obtained by a camera through photographing in a video recording process;
storing the image data in a first queue if the image data is data acquired by the camera based on triggering of a user;
storing the image data in a second queue if the image data is data acquired by the camera through automatic triggering, wherein the first queue and the second queue are different queues, wherein each piece of image data in the first queue and the second queue comprises start time information, image information, and end time information; and
after reading the start time information, the image information, and the end time information in the first image data from a queue in which the first image data is located, reading second image data in the first queue or the second queue to generate a second image.

12. The non-transitory computer-readable storage medium according to claim 11, the operations further comprising:
determining whether the image data is associated with identification data, wherein the identification data is used for indicating that the image data is the data acquired by the camera through automatic triggering; and
determining, if the image data is associated with the identification data, that the image data is the data acquired by the camera through automatic triggering.

13. The non-transitory computer-readable storage medium according to claim 11, wherein the acquiring image data comprises:
detecting, in the video recording process of the camera, whether an image acquired by the camera meets an automatic triggering photographing condition; and
generating, in a case that the image acquired by the camera meets the automatic triggering photographing condition, the image data according to the image acquired by the camera, and generating the identification data associated with the image data.

14. The non-transitory computer-readable storage medium according to claim 11, the operations further comprising:
reading first image data in the first queue or the second queue to generate a first image.

15. The non-transitory computer-readable storage medium according to claim 11, wherein the reading second image data in the first queue or the second queue to generate a second image comprises:
acquiring an acquisition time of a first piece of image data in the first queue, to obtain first time information;
acquiring an acquisition time of a first piece of image data in the second queue, to obtain second time information;
comparing a chronological order of the first time information and the second time information;
reading, if the first time information is earlier than the second time information, the first piece of image data in the first queue as the second image data, to generate the second image; and
reading, if the second time information is earlier than the first time information, the first piece of image data in the second queue as the second image data, to generate the second image.

\* \* \* \* \*